United States Patent [19]

Olson et al.

[11] 4,066,548

[45] Jan. 3, 1978

[54] SLUDGE HYDROEXTRACTOR

[75] Inventors: Larry Lee Olson; Richard Henry Jones, both of Gainesville, Fla.

[73] Assignees: Richard Henry Jones; Pasquale A. Corrado, Gainesville, Fla.

[21] Appl. No.: 713,488

[22] Filed: Aug. 11, 1976

[51] Int. Cl.$^2$ .............................................. B01D 33/14
[52] U.S. Cl. ................................... 210/160; 100/118; 100/153; 210/236; 210/350; 210/386; 210/400; 210/526; 210/DIG. 3
[58] Field of Search ............... 100/112, 118, 119, 120, 100/151–154; 210/386, 400, 401, 499, 526, 160, 236, 297, 350, DIG. 3

[56] References Cited

U.S. PATENT DOCUMENTS

| | | | |
|---|---|---|---|
| 3,459,122 | 8/1969 | Pastoors et al. | 210/386 |
| 3,605,607 | 5/1970 | Gujer | 100/118 |
| 3,699,881 | 10/1972 | Levin et al. | 100/118 |
| 3,796,149 | 3/1974 | Heissenberger | 100/118 |
| 3,800,952 | 4/1974 | Bastgen | 100/118 |
| 3,894,486 | 7/1975 | Sparowitz et al. | 100/118 |

*Primary Examiner*—Frank W. Lutter
*Assistant Examiner*—Frank Sever
*Attorney, Agent, or Firm*—Harold L. Stowell

[57] ABSTRACT

A process and apparatus for continuous removal of liquids from sludges. The apparatus includes an endless driven lower pervious belt and an endless driven upper impervious belt. The impervious belt is supported by an upper frame positioned above a fixed lower frame member by spring-loaded, adjustable hydraulic cylinders. The two belts are driven at different speeds to provide continuous shear on sludge pressed between the belts. Each belt is supported on a plurality of horizontally spaced rollers with the rollers for the upper belt and the rollers for the lower belt being longitudinally offset from each other. The horizontal roller spacing from the point of contact of the upper belt to the sludge as it is fed in between the belts is of a diminishing progression which may be arithmetic, geometric, or a combination thereof from the point of contact of the upper belt on the sludge to the discharge end. The adjustable hydraulic spring-loaded supporting arrangement for the upper frame and the diminishing spacing of the rollers provides for easily adjustable and increasing pressure on the sludge substantially irrespective of the thickness of the sludge as it is processed through the apparatus.

In the process, the sludge is pumped into a mixing chamber where it is pretreated and conditioned such that a preliminary extraction of liquid can occur as is known in the art. From the mixing chamber, the sludge flows to a preconditioner and then is deposited on the pervious belt for translation through a gravity dewatering zone. The partially dewatered sludge is carried by the pervious belt through a compression zone formed between a pair of belts which apply thereto a continuously increasing extractive pressure for pressing additional liquid out of the sludge material.

10 Claims, 4 Drawing Figures

SLUDGE HYDROEXTRACTOR

BACKGROUND OF THE INVENTION

1. Field of the Invention

This invention relates to a process and apparatus for extracting liquid from organic and/or inorganic sludge to form a sludge cake, i.e., an end product that is a solid or semi-solid and thus lacks the physical characteristic of a liquid sludge. A sludge cake as used herein is defined as the end product in cake, solid or semi-solid form derived by dewatering sludge and generally having a water content less than 90%.

2. Description of the Prior Art

The removal of water from sludge, both organic and/or inorganic, in the waste water treatment field has been a serious problem for a number of years. A number of arrangements have been used, such as press and vacuum filters, capillary band pass filters, centrifuges, thickeners, screening machines and combinations thereof, all of which suffer from a number of serious drawbacks. For example, there is a tendency for blockage of the filter media and rapid heavy wear of the machine parts. In addition, the generally low capacity of a given piece of equipment results in high installation and operating costs. Some of these problems have been minimized by use of an apparatus having a continuously rotating capillary band pass filter effecting a further dehydration by means of pressure rollers but, here also, the efficiencies have fallen short of expectations.

Several devices for dewatering sludge in horizontal press fashion are known to the art in a number of different constructions. Yet, they have not proven themselves to be completely satisfactory in operation because their practical construction is associated with a series of problems which up to now have not been resolved. One such problem resides in the fact that the forces occurring at the band filter are difficult to control.

When squeezing or pressing products in band filter presses, the press product initially is subjected, as a general rule, to its hydrostatic pressure. In so doing, a greater and greater amount of solid constituents deposit on the filter band. As soon as the solid coating increases, there begins the actual pressing or squeezing operation. While it is desirable that the pressure increase in the filter press climb linearly in accordance with the increasing hydrostatic pressure, the pressure in prior art presses increases very markedly towards infinity. Furthermore, local irregular deposition of solids at the filter press bands produce uncontrolled pressure peaks. Pressure increases in the press zone, as well as the occurrence of pressure peaks considerably change from one type of slurry to another. Additionally, the forces which prevail still are dependent upon certain equipment parameters, such as velocity of movement of the band, filter efficiency, and so forth. For example, there is known to the art a band filter press of the previously mentioned type wherein two support frames arranged in the machine housing serve to support the filter press bands. These filter press bands are situated upon a rigid support with at least one of the supports being pivotally mounted at the infeed side. Both frames are coupled with one another through springs or other resilient elements. The spring elements render it possible to absorb the press pressure in its entirety except for local pressure peaks acting upon the rigid frames.

With the buildup of the thickness of the sludge cake, the pressure exerted between the two belts may not be constant. Further, where the dewatering is dependent entirely on a pressing action, insufficient dewatering may result unless an excessively long belt or very high pressures are utilized.

OBJECTS OF THE INVENTION

It is, therefore, an object of the present invention to provide an improved process and apparatus for the removal of liquid from organic and inorganic sludge or combinations thereof.

Another object of the invention is the provision of an apparatus for removing liquid from sludge, which apparatus is simple in construction, relatively inexpensive to manufacture, capable of a long useful service with a minimum of maintenance and is easily adjustable to handle varying sludge conditions.

A further object of the present invention is the provision of an apparatus for extracting water from sludge which apparatus accomplishes this function efficiently and continuously.

SUMMARY OF THE INVENTION

In order to implement these and still further objects of the invention, which will become more readily apparent to those skilled in the art as the description proceeds, the inventive sludge hydroextractor is manifested by the features that the roller spacing from the point of contact between the belts to the discharge end of the machine is of a diminishing arithmetic or geometric progression, that is, the spacing between the rollers diminishes in a predictable fashion. Further, the upper and lower rollers are offset from each other thereby enabling a continually increasing extractive pressure to be exerted on the two belts as the sludge is processed through the machine. The pressure exerted between the two belts is easily adjustable and maintained by means of a spring-loaded, adjustable hydraulic piston support means. The upper frame is suspended over the lower frame by virtue of the spring-loaded, hydraulic pistons such that rocks or other generally uncompressible objects which may otherwise create untolerable pressures may be processed through the machine without damaging the rollers. Further, the spring-loaded, adjustable hydraulic pistons enable an increasing pressure to be maintained on the sludge cake substantially regardless of the thickness of the sludge cake.

BRIEF DESCRIPTION OF THE DRAWINGS

Other objects and advantages of this invention will become apparent from the following detailed description thereof and the accompanying drawings, wherein.

DESCRIPTION OF THE PREFERRED EMBODIMENT

Figure 1:
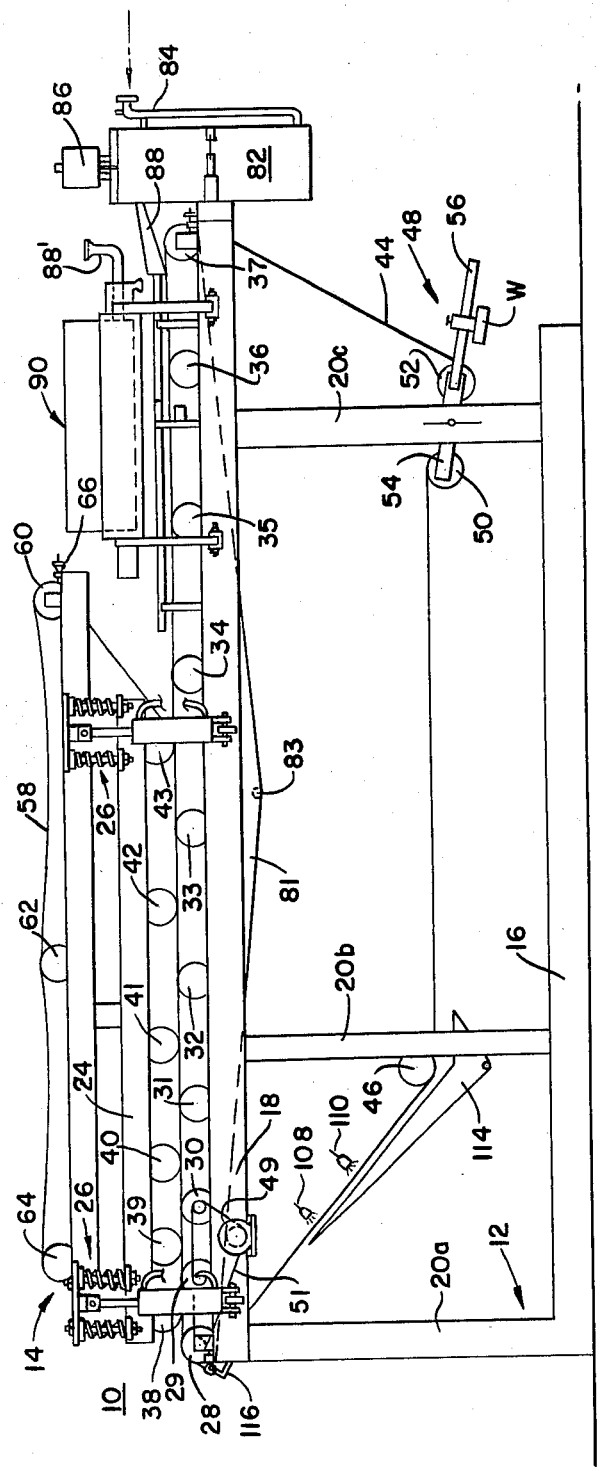
FIG. 1 is a side view of the hydroextractor of this invention.

Referring to the drawing and in particular FIG. 1, one side of a hydroextractor 10 is shown having a lower frame 12 and an upper frame 14. An endless lower belt 44 is stretched around rollers 28 to 37 and 46, and tensioning device 48 mounted on the lower frame in such a way that the belt travels in a taut condition with a minimum of sagging.

The lower frame 12, with one side shown, consists of a pair of base members 16 and a pair of horizontal beams 18 supported above the base members 16 by a plurality of vertical support members 20a, 20b and 20c.

The upper frame 14 is mounted so that it can be adjusted with respect to the lower frame 12 as to be more fully detailed hereinafter, and carries pressure rollers 38 to 43 and idler or return rollers 60, 61 and 62 around which passes an endless impervious upper pressure belt 58.

One side of upper frame 14 is shown and includes two spaced pairs of parallel beams 22 and 24. The uppermost beam 22 extends substantially beyond the sludge delivery end of lowermost beam 24, whereas lowermost beam 24 slightly extends beyond the other end of beam 22. The purpose for having beam 22 extend substantially beyond beam 24 is to create an angle on the belt 58 between idler roller 60 and pressure roller 43.

To support upper frame 14, on lower frame 12, there is provided at each corner of upper frame 14 an adjustable hydraulic spring-loaded device 26. The purpose of the hydraulic spring-loaded devices will be explained hereinafter.

As set forth, the lower frame 14 supports a plurality of rollers 28 through 37. The rollers 28 to 34 are extraction rollers, while rollers 35, 36 and 37 are conveying rollers. The distance between these rollers is such that roller 30 is further from roller 29 than roller 29 is from roller 28. The distance between rollers 28 through 34 increases from roller 28 to roller 37. In a preferred embodiment, the distance between these rollers is 8, 10, 12, 14, 16, 20, 24, 24 24, and 20 inches. Other spacings can be used; however, for most acceptable extraction using 3 to 6 inch diameter rollers, the above spacings give the best results. Of course, extraction rollers of smaller or larger diameter may require a corresponding smaller or larger roll spacing.

Like the extraction rollers 28 through 34 on the lower frame 12, pressure rollers 38 through 43 are differently spaced with the distance between the rollers 39 and 40 being greater than the distance between rollers 38 and 39 and so on. The preferred arithmetic progressive spacing using rollers of 3 to 6 inches in diameter is 10, 14, 18, 22 and 26 inches.

While the arithmetic progressive spacing of the rollers has proved to be very satisfactory, other arithmetic spacing and geometric spacing can also be employed.

An example of a useful geometric spacing for the pressure rollers would be 11.1, 14, 17.6, 22.2 and 27.9 inches. This is expressed by the formula:

$$10^{1 + (0.046 + (i/10))},$$

where $i = 0$ to 4

An example of a combined arithmetic and geometric spacing for the extraction rollers is: arithmetic progression (20, 24, 24, 24, 24), geometric progression (19.1, 17.3, 14.8, 11.3). The formula for the geometric spacing is in the form:

$$24 - 24^{(1 + (i/10))},$$

where $i = 1$ to 4

In aligning upper frame 14 for support on lower frame 12, the pressure rollers 38 through 43 on the upper frame are not immediately above the extraction rollers 28 through 34 on the lower frame 12, but are positioned between extraction rollers 28 through 34 such that roller 38 is positioned between rollers 29 and 30, roller 40 is positioned between rollers 30 and 31, and so on until roller 43 is positioned between rollers 33 and 34.

It can be seen that lower conveying rollers 35, 36 and 37 carry sludge material to be extracted to the area of the offset rollers and their respective belts 44 and 58. It is further contemplated that by using the arithmetic progressive spacing the rollers and the fact that the upper and lower rollers are offset from one another that a continually increasing pressure and extractive pressure is exerted to the sludge material.

The endless pervious belt 44 is preferably made of a woven polyester, nylon, metal or a combination of the preceding materials with opening sizes varying from 10 to 2000 microns. However, the preferred material used in the construction of the pervious belt is a woven polyester. The endless pervious belt 44 is drawn by drive extraction rollers 28, 29 and 30 over the lower extraction rollers and about an idler roller 46 and a belt tension means generally designated 48.

The drive means comprises a hydraulic motor 49 connected by a chain 51, FIG. 1, to sprockets secured to the shafts of rollers 28, 29 and 30. The drive chain may be replaced by a drive belt which allows quick and easy belt speed variations. The machine can also be driven by variable speed D.C. motors, as is known in the art.

The hydraulic drive system consists of an electric motor driven hydraulic pump, not shown, which may be remote from the press, and hose connections to the hydraulic drive unit 49 that is driven by the fluid pumped by the hydraulic pump. The speed of the hydraulic drive unit is controlled by a bypass valve on the hydraulic pump. The belt tensioner 48 includes a pair of idler rollers 50 and 52 supported between a pair of bar elements 54, as shown in FIG. 1, which bar elements 54 are pivotally affixed to the vertical support member 20c. Attached to one end of one or both of the bar elements 54 is a shaft 56 on which weight W can adjustably slide. To apply more tension to the belt 44 which runs over roller 50 and the under roller 52, weight W is moved further along shaft 56.

The impervious pressure belt 58, made of rubber or similar impervious belt material is driven by drive pressure roller 38 (connected to hydraulic motor 59 which in turn is connected to a motor driven pump via valve means not shown) across pressure rollers 43 to 38 to idler rollers 64, 62 and 60. To adjust the tension on impervious belt 58, idler roller 60 is horizontally movable by an adjustable screw means 66.

Driven extraction belt 44 and pressure belt 58 are in displacable adjustable contact with the surface of one another as they travel between the extraction rollers and pressure roller on the lower and upper frames. The nature of the displacable contact between belts 44 and 58 is such that as sludge material is carried between the belts forces created by the sludge separates the two belts. These separation forces of the sludge material are opposed by the hydraulic spring-loaded devices 26 which generally exert forces to pinch or squeeze the sludge material. However, the upper frame, at times, is operated where the two spring loaded hydraulic pistons at the point where sludge enters the press section are elevated such that the springs are in tension, not compression. This means that belts 44 and 58 may not come in contact until some distance into the press section. This in effect lengthens the free drain section.

Because of the offset spacing between the lower extraction rollers 28 through 34 and upper pressure rollers 38 through 43, the sludge material undergoes increased extraction pressure as the material travels from the point where the sludge enters between the belts 44 and 58 near rollers 34 and 43 to rollers 28 and 38 where the sludge material exists. This is due to the increasing pressure force of the upper frame 14 and pressure rollers 38 through 43 on the belts 44 and 58 and rotating extraction rollers 28 through 34 on the lower frame 12. Since the increasing pressure force may be controlled by raising or lowering the hydraulic spring-loaded devices and since the distance between the rollers decreases as the sludge material reaches rollers 28 and 39, and there is less slack in the two belts where the sludge material exits from between the belts than where it enters, this results in an increasing squeezing action on the sludge material. In fact, the belts are very taut in the area of the extraction rollers where the distance between rollers decreases. In this area, the greatest amount of extraction takes place, therefore, the sludge cake formed becomes less thick and considerably more dense. The extracted liquids are collected in pan 81, lying below the extraction rollers. The pan has a length substantially equal to the length of frame 18 and a drain 83.

Figure 3:
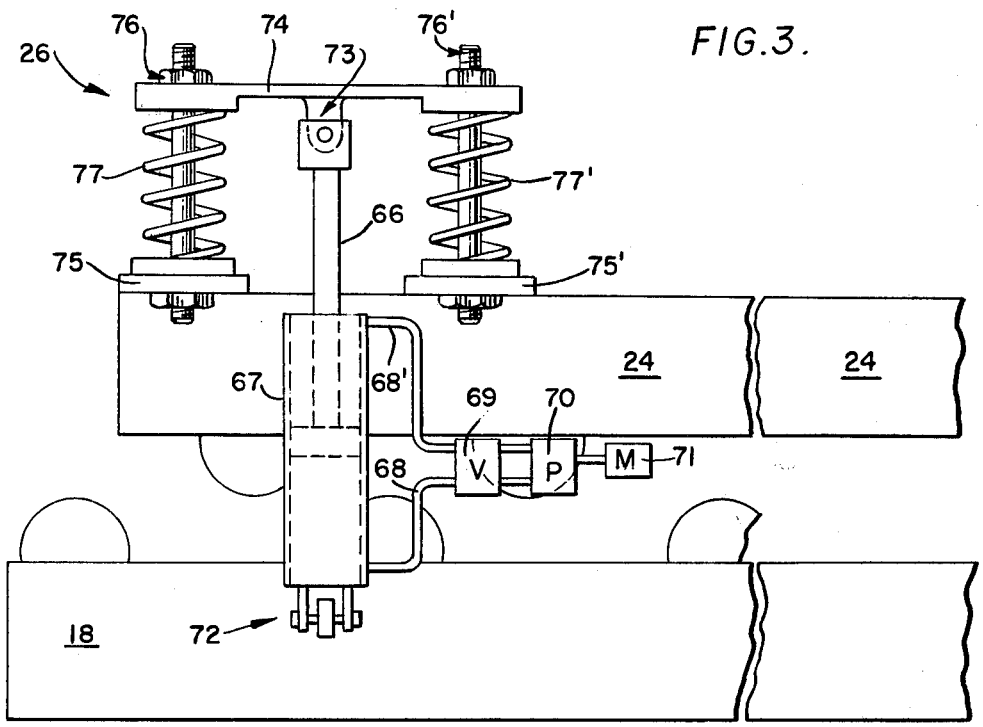
FIG. 3 is an enlarged view of the spring-loaded hydraulic devices.

To maintain the pressure between the extraction belts 44 and 58 there is provided the adjustable hydraulic spring-loaded devices 26 shown in FIGS. 1 and 3, which also support the upper frame 44 above lower frame 12. In FIG. 3, lowermost beam 24, of the upper frame, is shown supported by one of the hydraulic spring-loaded devices 26 above horizontal beam 18 of the lower frame. Each hydraulic spring-loaded device 26 includes a piston-shaft 66 slidably mounted in its cooperating hydraulic cylinder 67. The upper and lower ends of each of the cylinders 67 are connected via lines 68 and 68' to its flow control valve 69, which in turn are connected to a pump 70 driven by a motor 71, all as schematically illustrated in FIG. 3 of the drawing.

The lower end of each of the cylinders 67 are also connected via a clevis and pin assembly 72 to the lower stationary frame 18 of the extractor. The upper end of each of the piston rods 66 are pivotally connected as at 73 to a cross beam 74. The cross beams 74 are adjustably and resiliently connected to the upper movable beam or frame member 24 via a pair of plate members 75 and 75' which are secured such as by welding to the movable frame 24. Each of the plates 75 and 75' and the ends of each beam 74 are bored to receive a pair of adjusting bolts 76 and 76'. Between the inner surfaces of each beam 74 and the plates 75 and 75' and about each of the adjusting bolts 76 and 76' are a pair of helical springs 77 and 77'.

With this arrangement, it will be seen that there is a positive lifting torque applied to movable frame 24 as each piston rod 60 is moved upwardly while at the same time any object which might be damaging to the rolls, belts or frames in passing therebetween will move the frame 24 upwardly against the urging of the springs 77 and 77' and as soon as the obstruction passes, the springs will return the movable upper frame 24 to its adjusted position.

It will also be appreciated by those skilled in the art that since the adjusting or connecting bolts 76 and 76' can place greater or lesser compression on springs 77 and 77', each of the plural spring loaded hydraulic supporting means may be differently adjusted and a greater or lesser force may be applied to the rolls at, for example, the input end as compared to the output end of the extractor. Further, variances in the spacing between the pair of frames 18 and 24 may be brought about by directing varying amounts of hydraulic fluid to the hydraulic cylinders 67 via the individual flow control valves 69 for each of the spring-loaded hydraulically adjustable suspension means. Thus, the arrangement provides an extremely versatile unit. As hereinbefore set forth, should any solid objects, such as rocks, cans or similar objects be processed through the hydroextractor 10, the load springs 77 and 77' allow for upward movement of the upper frame 14 against the force of the springs without causing any damage to the belts and extractor rollers. Thus, as the objects are processed through the hydroextractor, the hydraulic-spring units tend to maintain the desired pressure between the upper belt 58 and the lower belt 44.

As stated, extraction rollers 28, 29 and 30 on the lower frame drive, the pervious lower belt 44 and extraction roller 38 on the upper frame drives the impervious upper belt 58. The upper extraction roller 38 is driven at a slightly greater rotational speed than the lower extraction rollers 28, 29 and 30. This speed differential provides continuous shear between upper belt 58 and lower belt 44 to accelerate the dewatering of the sludge cake material. The shearing action becomes more pronounced as the sludge material processes through the hydroextractor belts 44 and 58. Since the spacing between the extraction rollers comes increasingly closer together, the sludge material is bent and pressed several times, so that as a result of the shearing action buildup of particles within the already largely-drained sludge are caused to collapse, and the liquid in the cavities within is pressed out. The amount of differential speed of the two belts may be controlled by proper gear selection or by installation of a variable speed drive for the upper belt 58. Roller rotational velocities of from 0.5 rpm to about 10.0 rpm have been found to be very satisfactory.

Figure 2:
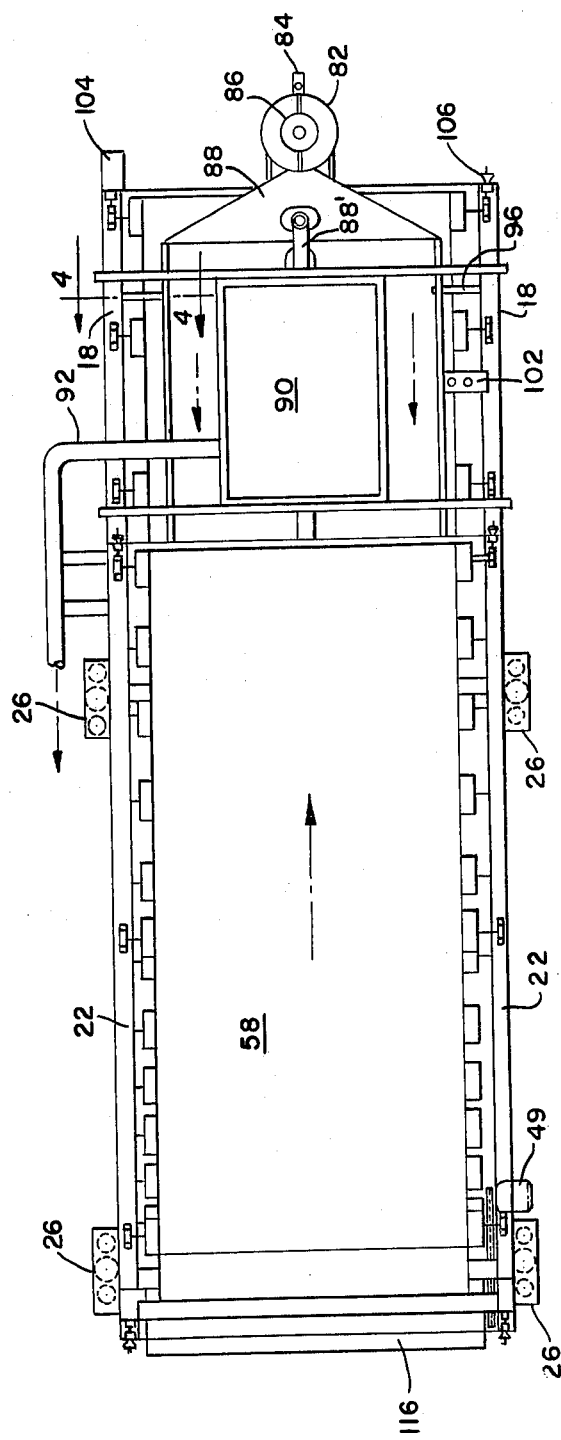
FIG. 2 is a top plan view of the hydroextractor of this invention.

There may be mounted on the lower frame at the input end slurry pretreatment equipment, shown in FIGS. 1 and 2, for treating the dirty water containing the sludge materials. The pretreatment equipment consists of a mixing drum 82 having an inlet 84 and a variable speed mixer 86. In the mixing drum 82 the sludge material is about the consistency of dirty water to which is added organic polyelectrolytes or other dewatering chemicals which causes the bound water to be released. The sludge is then pumped from the mixing drum to a sluice 88 or to a funnel 88' connected to a preconditioner 90 by adjustment of the vertical placement of the drum 82.

In the preconditioner 90, there is a mesh screen (not shown) where the sludge material is rolled about to cause additional preliminary extraction of the water from the sludge. A drain 92, shown in FIG. 2, removes the extracted water from the preconditioner 90. Additional organic polyelectrolytes or other dewatering chemicals may be added to the preconditioner 90 to further release bound water. Any additional water is also extracted from the sludge and removed through the drain 92. The sludge material is then deposited on the traveling lower pervious belt 44 for hydroextraction. The consistency of the sludge material coming from the preconditioner is of the consistency of a thick paste or very wet cardboard. It is, of course, possible to leave the pretreatment equipment off the hydroextractor machine, in which case, the pretreatment must be done at a remote location. It is further possible, depending upon the consistency of the sludge material, that the sludge can be directly applied to the traveling lower belt 44, bypassing the preconditioner 90.

Figure 4:
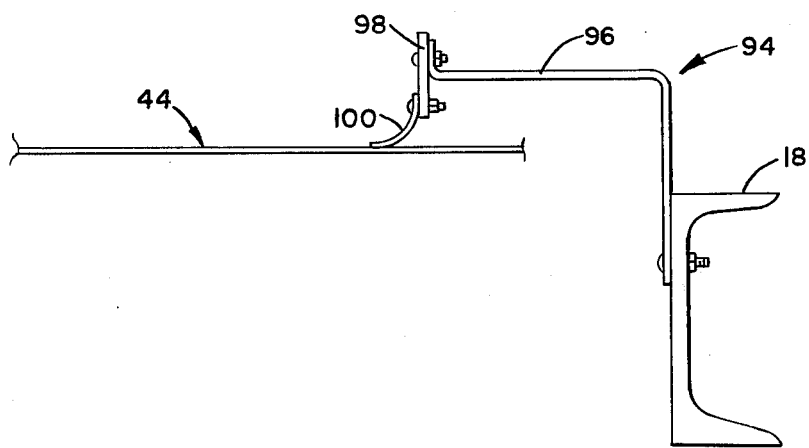
FIG. 4 is a section on line 4—4 of FIG. 2.

To confine the sludge material to the lower belt 44 so not to allow it to flow over the side edges of the belt, the sludge guide 94 is provided on either side of the belt 44 extending from near the end of the preconditioner 90 and stopping just short of the junction where the two belts 44 and 58 meet. The sludge guides 94 are bolted or otherwise secured to horizontal beam 18 on the lower frame 12 by a bracket 96, as shown in FIG. 4. Bar 98, shown in FIG. 4, supports a flexible wiper 100 for confining the sludge material to the area between the pair of guides 94. The wiper 100 is made of a resilient material and maintains a wiping seal with belt 44. The height of the sludge guides 94 from where the wiper 100 contacts the lower belt 44 to the top edge of the support 98 is of sufficient size to contain the sludge material between the guides.

Belt alignment is obtained by using a photocell system 102, shown in FIG. 2, for sensing the position of lower belt 44 and a linear actuator 104 for changing the direction of roller 37 such that the belt direction is realigned. There is also a manual belt alignment device 106 which operates independent of the photocell system and linear actuator. These are conventional devices known in the patent arts and, therefore, form no specific part of this invention.

To clean the lower belt 44, a pair of water sprays 108 and 110 are provided, along with drain pan 114 and at the exit end of belt 44 and in contact with the belt as it passes over roller 38, a scraper 116 aids in removing the formed sludge cake from the hydroextractor.

It has been found that by using non-resilient extraction rollers on the upper frame it is easier to maintain a proper tautness and alignment of belt 58. The extraction rollers on the lower frame may either be resilient or non-resilient; however, should non-resilient rollers be used, the squeezing action between the belts 44 and 58 is somewhat greater.

In the preferred embodiment, sludge containing water which has been pretreated and preconditioned, either by equipment located on the hydroextractor 10 or at a remote location is deposed on the conveying end of lower extraction belt 44, between sludge guides 94. The pervious weave of belt 44 allows for continuous draining of water from the sludge material, even as it is being conveyed across rollers 35, 36 and 37. The sludge material enters between extraction belt 44 and pressure belt 58 where upper pressure belt 58 is at an angle to lower extraction belt 44. The angle formed between the two belts creates an initial squeezing on the sludge material. Proceeding between the belts 44 and 58 the sludge material is continually squeezed and the sludge material is also undergoing a shearing because of the different speeds at which the belts 44 and 58 are driven.

Although only one specific form of the invention has been described and illustrated in the accompanying drawings, it will be understood that various modifications and changes may be made by those skilled in the art without departing from the inventive concept. Reference should therefore be made to the appended claims for a definition of the scope of the invention.

I claim:

1. An apparatus for the continuous hydroextraction of water containing sludge material comprising:
   a. a lower support frame;
   b. a plurality of extraction rollers on said lower support frame having a feed end and an exit end;
   c. a pervious extraction belt driven over said extraction rollers;
   d. an upper frame supported above said lower frame;
   e. a plurality of pressure rollers on said upper frame having a feed end and an exit end corresponding to the feed end and exit end of said extraction rollers;
   f. an impervious pressure belt driven over said pressure rollers, said pressure belt contacting said extraction belt to squeeze sludge material passing therebetween;
   g. means adjustably supporting said upper frame above said lower frame;
   h. selectively variable means driving said extraction rollers and selectively variable means driving said pressure belt at a speed different from the speed at which said extraction belt is driven; and
   i. means to apply continuously increasing pressure contact to said extraction belt and said pressure belt from where the sludge material enters between said belts to where the sludge material extis;

wherein said means to apply continuously increasing pressure contact includes a predetermined, diminishing, progressive spacing of said extraction rollers and said pressure rollers, and an offset alignment of said pressure rollers between said extraction rollers, said means g., h., and i., cooperatively functioning to provide a sludge cake of substantially uniform thickness.

2. An apparatus as claimed in claim 1 including means for applying an increasing downward pressure to said pressure rollers to cause said pressure belt and said extraction belt to become increasingly taut as said belt travel between said pressure rollers and said extraction rollers.

3. An apparatus as claimed in claim 2 wherein said pressure rollers are a non-resilient material.

4. An apparatus as claimed in claim 2 wherein said means applying downward pressure to said pressure rollers supports said upper frame above said lower frame.

5. An apparatus as claimed in claim 4 wherein said means applying downward pressure to said pressure rollers and supporting said upper frame comprise a plurality of adjustable hydraulic spring-loaded devices positioned between said lower frame and said upper frame.

6. An apparatus as claimed in claim 1 wherein said arithmetic spacing means applying continuously increasing pressure contact to said pressure belt and said extraction belt includes different arithmetic progression spacings of said pressure rollers and said extraction rollers, without disrupting the offset alignment of said pressure rollers and said extraction rollers.

7. An apparatus as claimed in claim 6 wherein the arithmetic progressions of said extraction rollers and said pressure rollers decrease from the feed ends to the exit ends.

8. An apparatus as claimed in claim 7 wherein said arithmetic progressions of said extraction rollers in inches is 8, 10, 12, 14, 16, 20, 24, 24, and 20.

9. An apparatus as claimed in claim 8 wherein said arithmetic progression of said pressure rollers in inches is 26, 22, 18, 14 and 10.

10. An apparatus as claimed in claim 9 wherein said pressure rollers and said extraction rollers have a diameter of about 3 to 6 inches.

* * * * *

UNITED STATES PATENT AND TRADEMARK OFFICE
CERTIFICATE OF CORRECTION

PATENT NO. : 4,066,548
DATED : January 3, 1978
INVENTOR(S) : LARRY LEE OLSON and RICHARD HENRY JONES It is certified that error appears in the above-identified patent and that said Letters Patent are hereby corrected as shown below:

IN THE CLAIMS

6. An apparatus as claimed in claim 1 wherein said [arithmetic] progressive spacing means applying continuously increasing pressure contact to said pressure belt and said extraction belt includes different arithmetic progression spacings of said pressure rollers and said extraction rollers, without disrupting the offset alignment of said pressure rollers and said extraction rollers.

Signed and Sealed this

Second Day of May 1978

[SEAL]

Attest:

RUTH C. MASON
Attesting Officer

LUTRELLE F. PARKER
Acting Commissioner of Patents and Trademarks